(12) United States Patent
Monsrud et al.

(10) Patent No.: US 7,090,229 B2
(45) Date of Patent: Aug. 15, 2006

(54) ANTI-DART SNOWMOBILE SKI

(75) Inventors: Edwin A. Monsrud, Roseau, MN (US); Robert W. Przekwas, Roseau, MN (US); Arlyn T. Saagge, Roseau, MN (US); Keith W. Peppel, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 10/885,496

(22) Filed: Jul. 6, 2004

(65) Prior Publication Data

US 2005/0280224 A1    Dec. 22, 2005

Related U.S. Application Data

(63) Continuation of application No. 10/061,839, filed on Feb. 1, 2002, now abandoned.

(51) Int. Cl.
    *A63C 5/044*      (2006.01)
(52) U.S. Cl. ........................................ 280/28
(58) Field of Classification Search .................. 280/28, 280/22, 602, 606, 608, 609, 11.18; 180/184, 180/182, 190
See application file for complete search history.

(56) References Cited

U.S. PATENT DOCUMENTS

| 3,711,109 | A | 1/1973 | Hofbauer | 280/28 |
|---|---|---|---|---|
| 3,718,341 | A | 2/1973 | Westberg | 280/28 |
| 3,817,544 | A | 6/1974 | Labelle | 280/28 |
| 3,964,561 | A | 6/1976 | Lunzer et al. | 180/5 R |
| 4,491,333 | A | 1/1985 | Warnke | 280/28 |
| 5,040,818 | A | 8/1991 | Metheny | 280/609 |
| 5,145,201 | A | 9/1992 | Metheny | 280/28 |
| 5,165,709 | A | 11/1992 | Jacques | 280/28 |
| 5,222,749 | A | 6/1993 | Bergstrom | 280/28 |
| 5,344,168 | A | 9/1994 | Olson et al. | 280/28 |
| 5,360,220 | A | 11/1994 | Simmons | 280/28 |
| 5,700,020 | A | 12/1997 | Noble | 280/28 |
| 5,836,594 | A | 11/1998 | Simmons | 280/28 |
| 6,012,728 | A | 1/2000 | Noble | 280/28 |
| 6,267,392 | B1 | 7/2001 | Noble | 280/28 |
| 6,378,889 | B1 | 4/2002 | Moriyama et al. | 280/28 |
| 6,431,561 | B1 | 8/2002 | Hedlund | 280/28 |
| 6,513,612 | B1 | 2/2003 | Moriyama et al. | 280/609 |
| 6,520,512 | B1 | 2/2003 | Lachance | 280/28 |
| 6,631,912 | B1 | 10/2003 | Metheny | 280/28 |
| 2003/0034619 | A1* | 2/2003 | Bergstrom | 280/28 |
| 2004/0160026 | A1* | 8/2004 | Lund | 280/28 |
| 2004/0227312 | A1* | 11/2004 | Dick et al. | 280/28 |

* cited by examiner

*Primary Examiner*—Jeff Restifo
(74) *Attorney, Agent, or Firm*—Baker & Daniels LLP (57) ABSTRACT

An anti-darting ski for snowmobiles, the ski including a longitudinally extending runner with a central keel. A generally flat wear strip with two skags is attached to the bottom of the keel. The wear strip is contoured to match the bottom surface of the keel. The skags are laterally spaced beneath the wear strip such that their inside surfaces do not extend towards each other. The skags and wear strip may be mounted flush with the outside edges of the keel. The skags may also be located asymmetrically about a longitudinal center point of the ski. The dual skag system acts to minimize darting of the snowmobile in the snow.

17 Claims, 7 Drawing Sheets

ANTI-DART SNOWMOBILE SKI

CROSS-REFERENCE

This application is a continuation of application Ser. No. 10/061,839, filed Feb. 1, 2002 now abandoned.

FIELD OF THE INVENTION

The present invention relates to improving the steerability of a snowmobile and reducing the problem of snowmobile ski darting and tracking, and in particular to snowmobile skis having a dual skag configuration for reducing darting movements of the snowmobile.

BACKGROUND OF THE INVENTION

Snowmobile skis often have elongated steering skags carried on the bottom for the ski that act as a narrow type of keel to increase the bite of the ski into the snow when the ski is turned. Skis and skags leave an impression in the snow corresponding to the bottom profile of the ski and skag. Particularly in wet or compacted snow, a snowmobile ski coming upon the impression left by a previous snowmobile ski will tend to follow the same track (especially if the temperature has dropped causing the wet snow to freeze). This effect is known as tracking or darting. Darting forces the snowmobile operator to compensate or correct for the tracking steering forces by over-steering the vehicle to maintain directional stability. Darting can be quite severe particularly if the snow containing the initial track was wet and has refrozen (such as on a sunny winter day followed by a cold night—typical snowmobiling weather).

The skag of a snowmobile following such a track will naturally situate itself in the previous impression and a considerable effort is required to steer out of such a track. Over time, darting can cause the driver to become fatigued from the effort of steering. In addition, the snowmobile may feel unstable due to the frequent abrupt directional changes experienced with darting. A need exists, therefore, for a snowmobile ski that reduces the problem of darting.

U.S. Pat. No. 5,836,594, issued to Simmons discloses a snowmobile ski having a downwardly extending longitudinal side portion on each side of the middle portion of the snowmobile ski. The longitudinal side portions are formed from the sides of the snowmobile ski extending downwardly. The downwardly extending longitudinal side portions of the ski are centrally located along the length of the ski. As the downwardly extending longitudinal side portions descend, the outside wall of each such downwardly extending longitudinal side portion tapers inward. A metal guide rod is attached to, and runs longitudinally along, the bottom of each of the downwardly extending longitudinal side portions at the edge of the bottom of the downwardly extending longitudinal side portion.

Figure 1A:
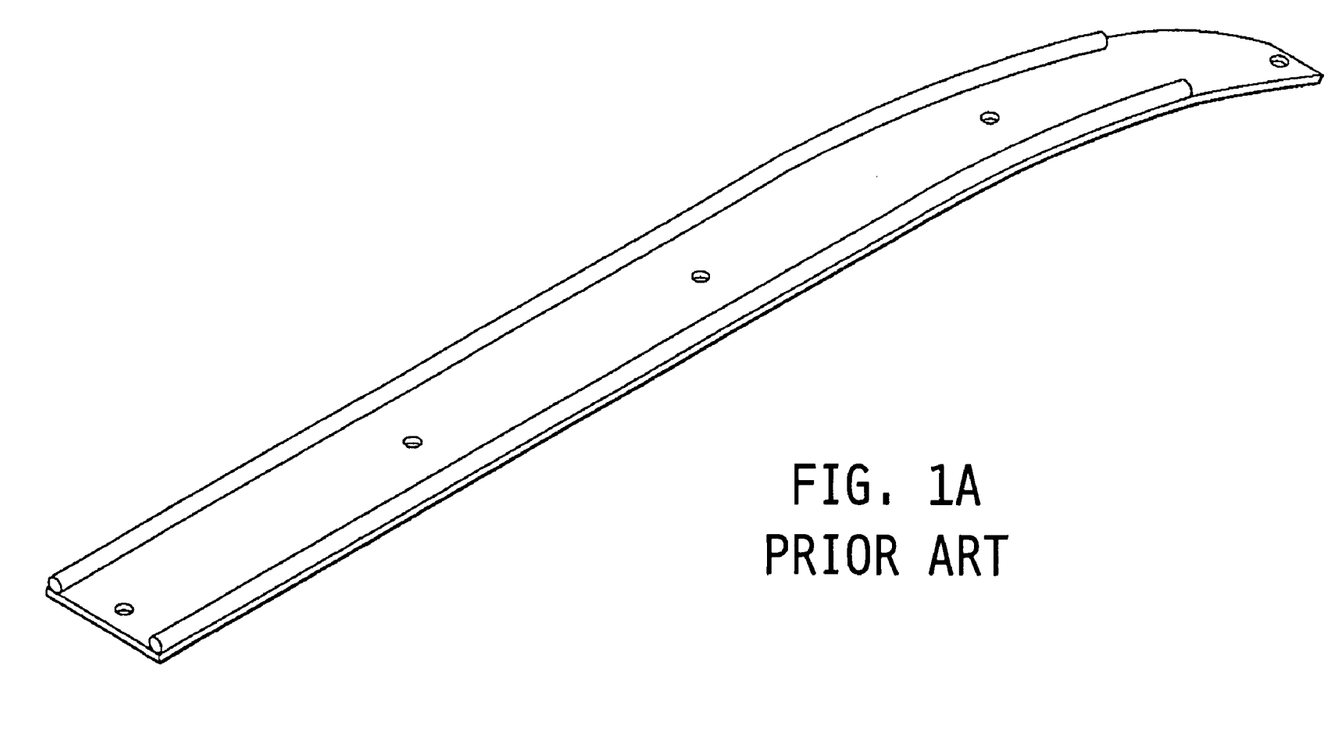
FIG. 1A is a perspective view of the underside of a prior art dual skag attachment.
Figure 1B:
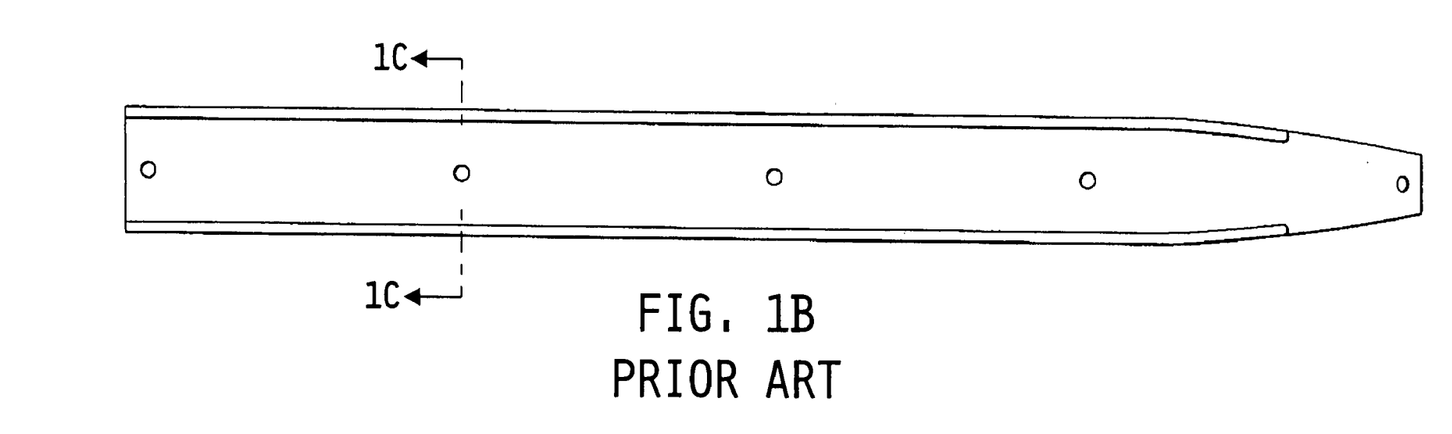
FIG. 1B is a bottom view of the prior art dual skag attachment in FIG. 1A.
Figure 1C:
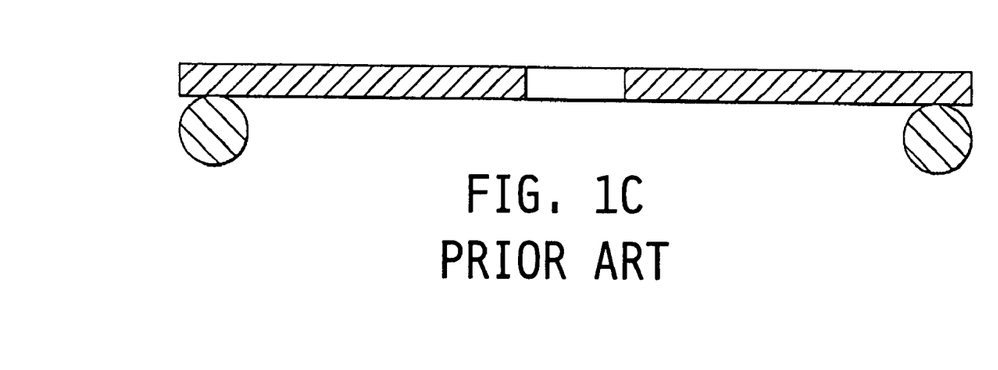
FIG. 1C is a cross-sectional view taken along line 1C—1C in FIG. 1B.
Figure 2A:
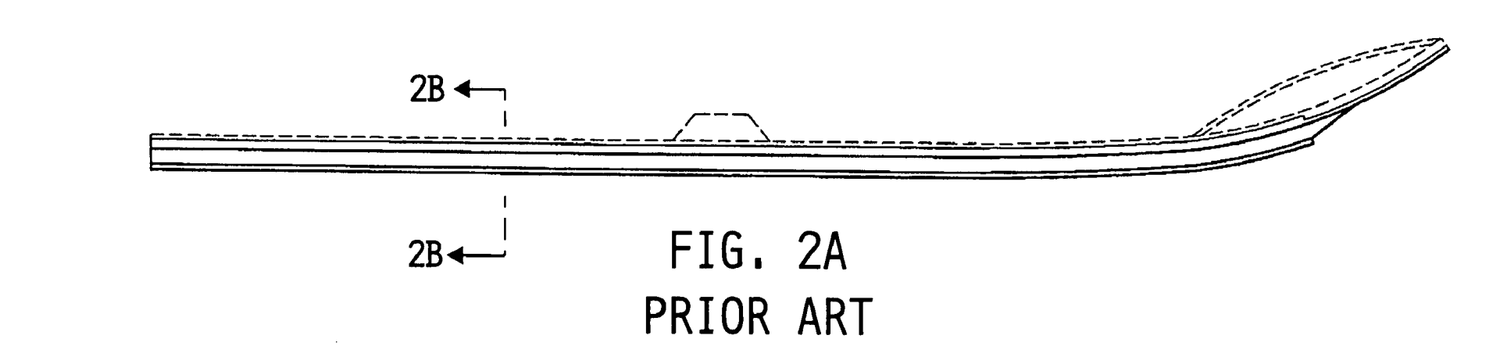
FIG. 2A is a plan view of a prior art ski with dual skags.
Figure 2B:
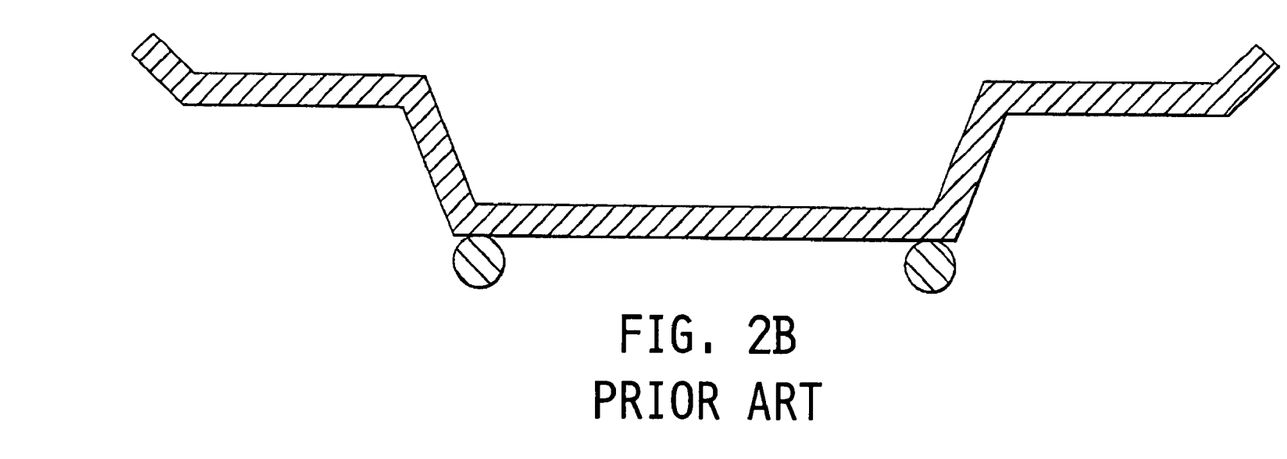
FIG. 2B is a cross-sectional view taken along line 2B—2B in FIG. 2A.

At least two other skis are available that include dual skags. Those skis do not adequately solve the darting problem and also suffer various drawbacks. The prior art ski shown in FIGS. 1A–1C includes a dual runner skag for attachment to the bottom surface of a generally flat bottom ski. The dual runner skag includes two wear bars attached at the outside bottom edges of a flat plate. The plate and skags are typical of the prior art in that they extend along a significant length (if not the entire length) of the bottom surface of the ski. The long wear bar and skags can impair the steerability of the snowmobile. The prior art ski shown in FIGS. 2A–2B includes two round skags attached at the outer edges of the ski's keel. This ski, however, is exposed to considerable wear. In addition, debris can become lodged between the skags.

SUMMARY OF THE INVENTION

The invention provides a snowmobile ski configured for lessening the effect of darting movements of the snowmobile during operation. In one embodiment, the ski includes a longitudinally extending runner, a keel, a wear strip and two skags. The keel extends downward from the bottom surface of the runner. The wear strip mounts to and is contoured to follow the bottom surface of the keel. The skags extend longitudinally along the keel and below the wear strip. The skags are laterally spaced such that their inside surfaces do not extend towards each other. The keel and the skags work together to bite into the snow for better steering of the snowmobile with reduced darting.

In an alternative embodiment, the anti-dart snowmobile ski includes a longitudinally extending runner, a keel, a wear strip and two skags. The skags are located below the wear strip and asymmetrically about a longitudinal center point of the runner.

A further embodiment of the invention includes a kit for converting a single skag ski into a dual skag ski having a wear strip where the skags are of generally rectangular cross-section.

DETAILED DESCRIPTION OF THE INVENTION

The snowmobile ski of the present invention is generally designated 12 and is usable on conventional snowmobiles. Such skis may be attached to a snowmobile in a variety of ways well-known in the art.

Figure 3:
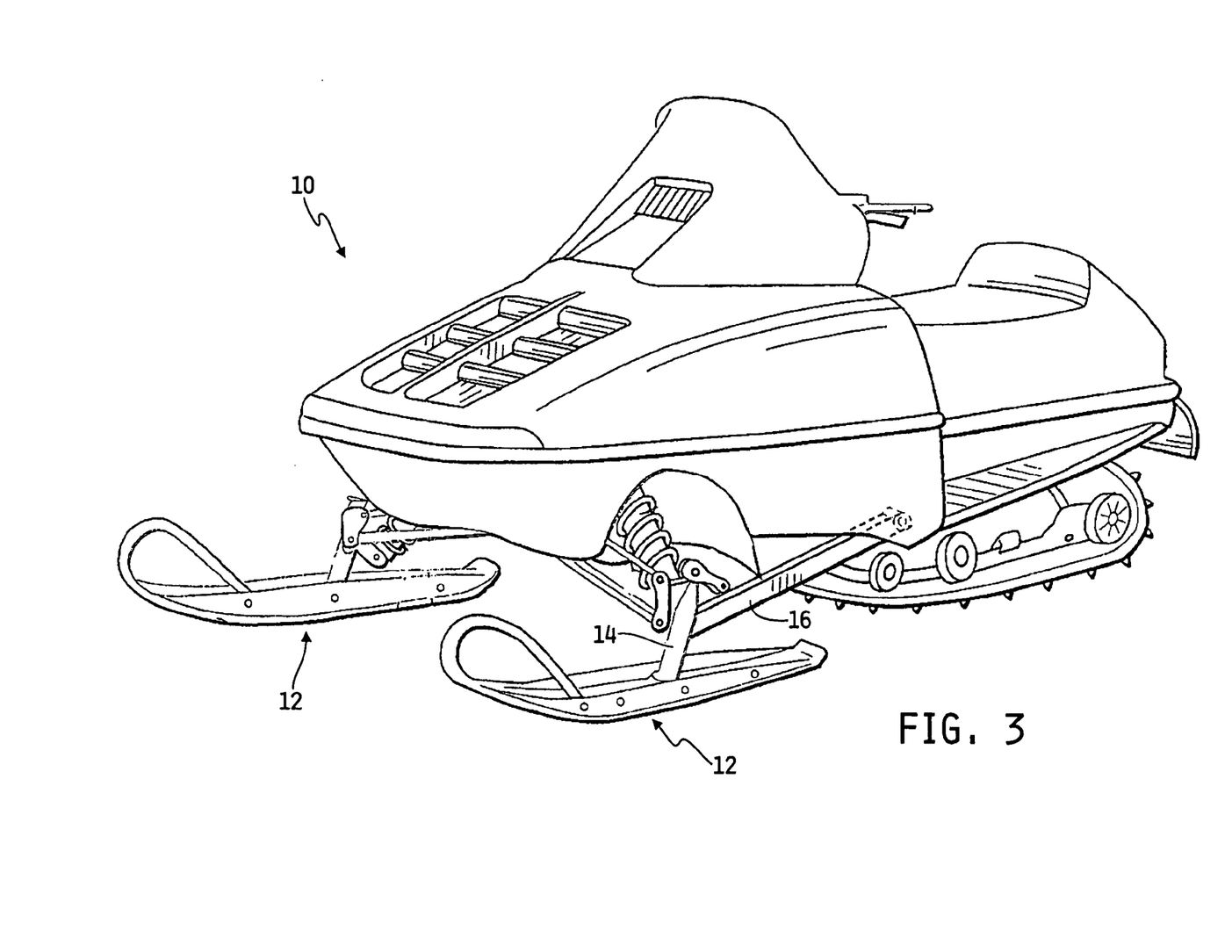
FIG. 3 is a perspective view of a snowmobile having a ski according to the present invention.

FIG. 3 depicts a standard snowmobile 10 to which the ski 12 may be attached. The ski 10 is secured to an upwardly extending spindle 14. The spindle 14 in turn is rotatably disposed within (and, in the drawings, concealed by) a generally cylindrical sleeve or mounting column carried at the front end of a trailing arm 16. The spindle 14 is rotated by a steering linkage system to cause the ski 12 to turn in the desired direction, as is well known in the art. Alternatively, the spindle 14 may be directly connected to the steering linkage system without the use of a cylindrical sleeve. In addition, the spindle 14 may attach to the ski 12 via a mounting skirt or mounting collar. The skirt, in some configurations, helps hold the ski's radius or keep the ski flattened. The addition of a wear strip under the ski, as noted below, may also help form and hold the ski's radius and keep the ski flattened without the use of a mounting skirt.

Figure 4:
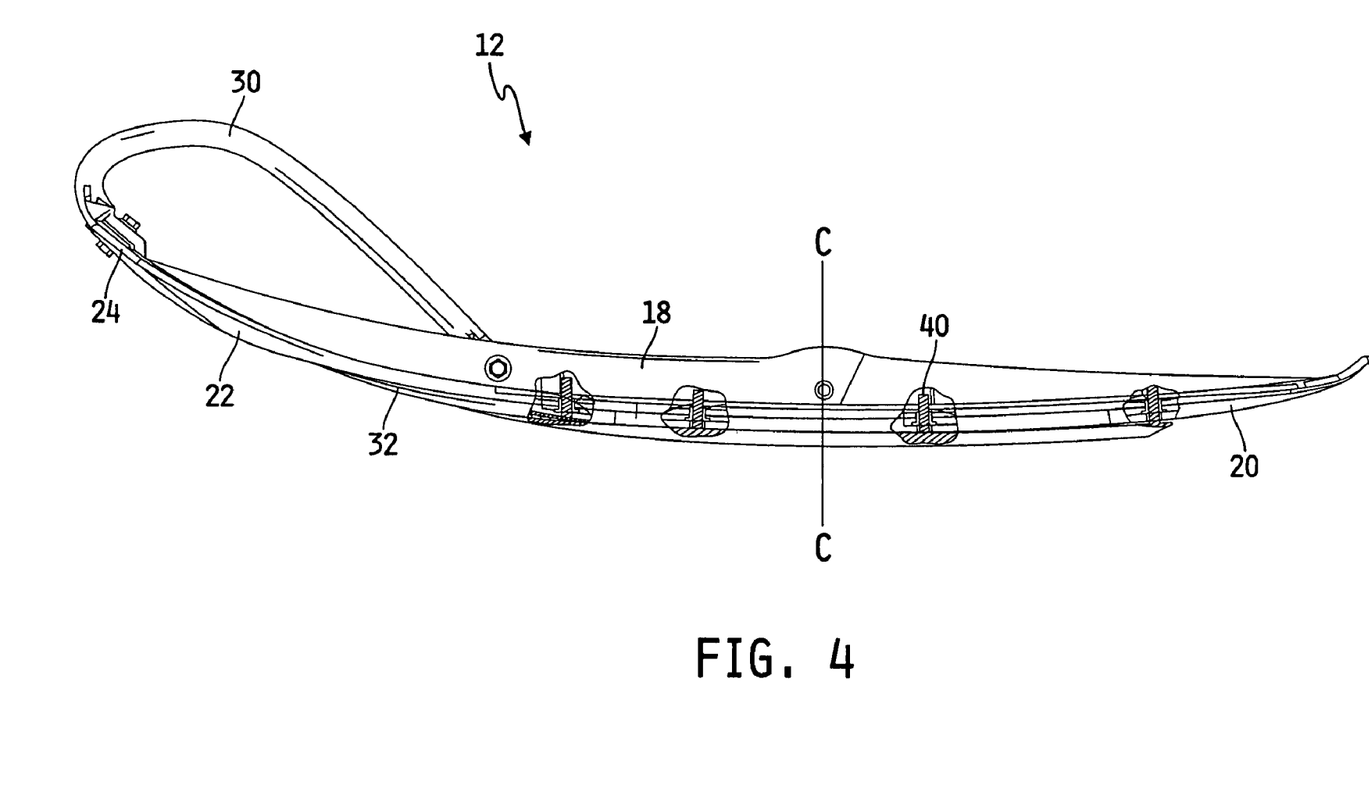
FIG. 4 is a plan view of the ski of the present invention showing internal connection mechanisms.

As seen in FIG. 4, one embodiment of the ski 12 of the present invention includes an elongated runner portion 18 and an integrated keel 20 extending longitudinally underneath a portion of the runner 18. The keel 20 is attached to (or may be integral with) the bottom surface of the runner 18 and preferably extends centrally along a portion of the length of the runner. The ski runner 18 includes an upwardly curved forward portion 22 that terminates in a rounded tip 24.

Figure 5:
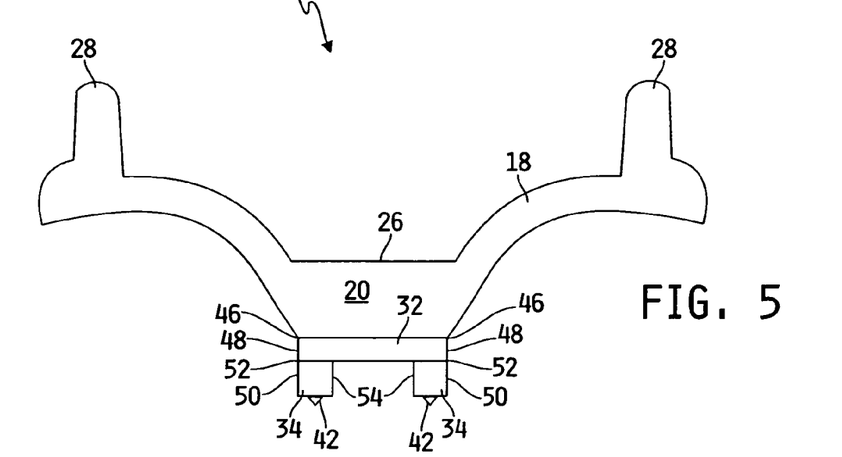
FIG. 5 is an end sectional view of one embodiment of a ski of the present invention.

As shown by the cross-sectional view of ski 12 in FIG. 5, the runner 18 typically has a central trench 26 where the bottom-most point of the trench 22 flows into the top of the keel 20. The keel 20 therefore extends centrally along a portion of the length of the runner 18. The runner 18 is typically symmetrical from side-to-side at most points along its length, although it could also be asymmetrical with a relatively wider portion either interior or exterior to the keel 20. The ski 12 typically includes two reinforcing beams 28 that run along the most of the length of the top of the runner 18 and attach to the curved forward portion 22. As shown in FIG. 4, the runner 18 may also contain a curved rod 30 attached between the tip 24 and the body 26 of the runner. This rod 30 gives structural support to the front curved portion 22 and serves as a grab handle for manually moving the skis.

Referring to both FIGS. 4 and 5, a wear strip 32 may be attached to the bottom of the keel 20, and two parallel wear bars or skags 34 may then be attached to the keel 20 along the bottom side of the wear strip 32. The wear strip 32 is desirably contoured to abut the keel 20 along the underside of the central trench 26 of the runner 18. The wear strip 32 thereby provides a wear surface to protect the keel 20. Preferably the strip 32 has a rectangular cross-section and is of sufficient length such that it extends forwardly of the skags 34 and rearwardly behind the skags 34. However, the wear strip 32 preferably does not extend the entire length of the runner bottom 18.

Figure 6:
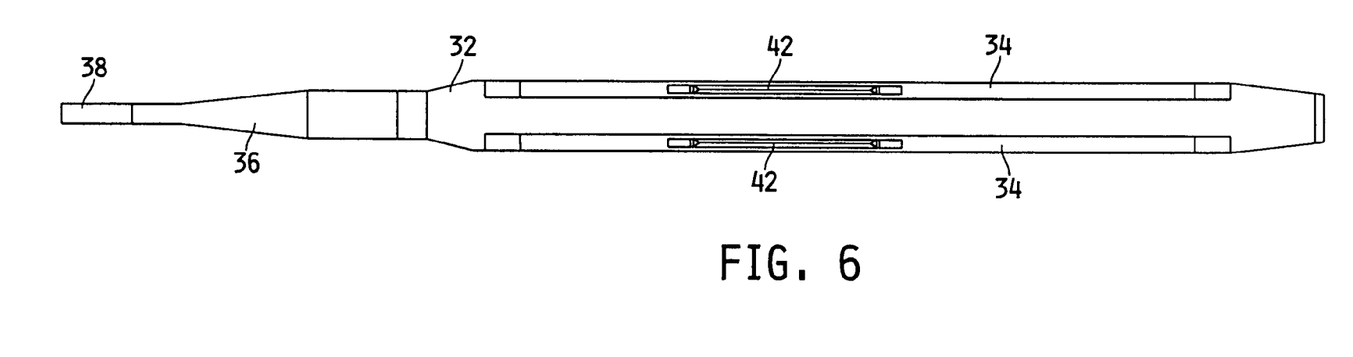
FIG. 6 is a bottom view of an embodiment of a ski conversion kit according to the present invention.
Figure 7:
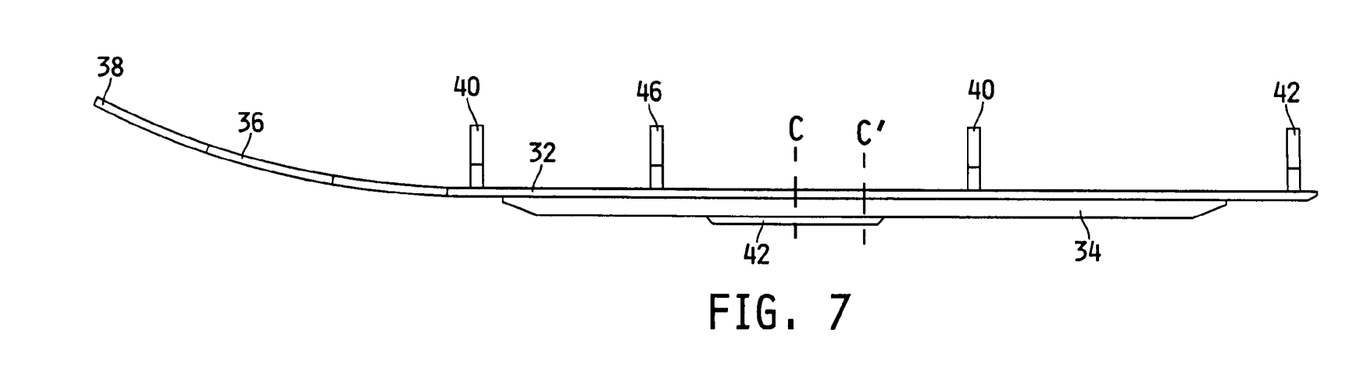
FIG. 7 is a side sectional view of one embodiment of a ski of the present invention.

As shown best in FIGS. 4, 6 and 7, a preferred embodiment of the wear strip 32 includes a generally straight body and an upwardly curved forward portion 36 contoured to follow the underside of the ski, generally along the keel 20. The strip's curved section 36 continues to extend upward, flush with the curved forward portion 22 of the runner 18, and preferably contains a tapered section that terminates in a blunt point 38. The tapered point 38 is optionally inserted through the runner 18.

A preferred configuration, shown in FIGS. 4 and 7, for attaching the wear strip 32 to the runner 18 includes a series of threaded shafts 40 that extend upwardly from the wear strip 32 through holes in the runner 18, wherein a nut is threadingly received by each of the shafts on the top side of the runner. It is noted, however, that the wear strip 32 may be attached to the runner 18 and/or keel 20 by any suitable arrangement. As stated above, the forward upwardly curved section 36 of the wear strip terminating in tip 38 may be inserted into a gap in the forward portion of the runner 18.

As seen best in FIGS. 5 and 6, one embodiment of the present invention provides two wear bars or skags 34 attached to the bottom of the wear strip 32 and parallel to each other along the length of the strip 32. The skags 34 act to dig into the snow and aid in steering and turning. The skags 34 particularly aid in resisting darting of the ski 12. The skags 34 are preferably comprised of a wear-resistant material, such as metal, and more preferably, such as steel or stainless steel. Since skis 12 are typically made primarily of plastic or composite, the skags 34 and/or wear strip 32 reduce the wear on the keel 20. When the skags 34 and/or wear strip 32 wear down from use, they may be replaced without having to replace the entire ski 12.

As a further option, to reduce wear on the skags 34, a carbide strip 42 may be connected to and descend from a central portion of each skag 34. The carbide 42 may further be shaped into a sharp edge to increase steering ability on ice.

Wear strip 32 should be of sufficient width to accommodate mounting of two parallel skags 34. The skags 34 may be welded to wear strip 32 or mounted in other suitable manners (e.g., riveted, bolted, etc.). In an alternative embodiment, shown in FIG. 8, the skags and wear strip are combined into a single, integrated unit 44. The integrated skag and wear strip unit 44 may be formed by any suitable method, such as from rolled steel, die-casting, etc. For instance, ten gauge steel may be stamped or formed into a preferred shape, such as that shown in FIG. 8. In order to hold carbide strips 42, v-shaped grooves may be machined into the outside edges of the steel, which later become the longitudinal bottom surfaces of the skags 34 of the integrated unit 44 after the steel is stamped or formed.

In the embodiment shown in FIG. 5, the skags 34 and wear strip 32 act as an extended, deep keel for better turning in the snow. This extended keel is created by alignment of the outsides of the skags 34, wear strip 32 and keel 20. That is, the keel 20 has outer, bottom edges 46. These bottom edges 46 are extended downward by the outer surfaces 48 (which can be approximated as edges due to the shallow depth of strip 32) of wear strip 32. Each skag 34 also has an outer surface 50, the top of which forms an edge 52. An extended keel that provides better turning is formed when the keel edge 46, wear strip outer surface 48, and the skag edge 52 are aligned in the downward direction. If the skag outer surface 50 is also aligned with the other edges and surface 46, 48, and 52, turning and cornering is further improved. The skag outer surface 50 can also angle inward or outward (curved or linearly) downward away from the aligned edges and surfaces.

Additionally, the dual-skag configuration helps to prevent darting that otherwise might occur in a deep steering ski. The skags 34 are offset from each other, creating a space or channel between the inside surfaces 54 of the skags 34. Prior art skis have attached dual skags to opposite outside edges of a runner—thereby providing the maximum possible distance between two skags on a ski. However, while such configuration may aid in darting, the presence of a centrally located keel (about the ski's width) improves steering ability. The present invention combines these features by attaching dual skags to a central keel to provide benefits in steering ability and anti-darting. Furthermore, attaching the skags to a wear strip protects the ski from excessive wear and is particularly preferred.

As noted above, in common prior art skis, the single skag extends nearly the entire length of the runner. A dual skag configuration having such long skags extending the over much of the length of the ski, it is believed, would impair the steerability of the snowmobile by requiring greater steering torque. While any length of skag 34 may be used, a shorter length typically is best for steering purposes. In the preferred embodiment, a skag 34 length of about 13–16 inches is preferred, and length of about 16 inches is most preferred. This length is small in comparison to the common ski length of between about 40–45 inches. Shorter skags have a smaller, shorter surface contacting the ground than skags typical of the prior art. With the shorter surface, less steering torque is required to turn the skags and, therefore, less effort is needed to steer the snowmobile than is needed to steer a conventional longer skag ski. This is particularly beneficial when using skags attached to a deep keel.

Any portion of the ski that contacts the ground is subject to greater wear. Protecting the wear areas of the runner 18 and/or keel 20, therefore, extends their life. Left exposed, the area of the runner 18 most likely to experience wear is the portion of the runner 18 where the curved portion 22 (FIG. 4) first begins to ascend away from the elongated runner 18 body. Normally this portion 22 is protected by the long skag of the prior art. The shorter skags 34 of the invention, however, could expose this high-wear area 22. Thus, it is desirable to have a wear strip 32 extending forwardly past this portion of the runner 18 to protect it from wear. Once the wear strip 32 is severely worn, it may be replaced with a new one.

In addition, the wear strip acts with the dual skags to reduce darting of the ski. As a snowmobile traverses the snow, prior art, single-skag skis leave a distinct impression behind. The skis of snowmobiles coming upon this track will have a tendency to follow the skag impression left previously. This phenomenon, known as "darting" or "tracking", causes the driver of a snowmobile to compensate or correct for the frequently undesired steering forces to maintain directional stability. The present invention acts to significantly reduce the susceptibility to darting. First, the wear strip 32 at least partially fills in any encountered tracks and at least partially fills in its own tracks left behind. As the snowmobile runner of the present invention traverses the snow, the wear strip 32, which extends forwardly of the skags 34, encounters the old track first and acts to at least partially crush the sides of the track so that the track is partially filled in and less defined. The skags 34 then have a fresh trail upon which to steer. Further, while one of the skags 34 may tend to follow the track left by prior snowmobiles, the remaining skag 34 itself digs into the snow and stabilizes the ski from darting. As the snowmobile continues on, the wear strip 32 portion extending behind the skags 34 acts to at least partially fill in the skag 34 impressions.

Preferably, the skags 34 are not centered along the longitudinal length of the running surface of the runner 18. The skags 34 preferably extend further behind the center point "C" of the longitudinal running surface of the runner 18 than they extend in front of the center point "C" of the longitudinal running surface of the runner 18. That is, the center of the skags lies behind C. Thus, there is less leading skag than there is trailing skag. In a particularly preferred embodiment, the trailing/leading ratio is about 60/40. This ratio has been found to provide resistance to darting, and self-straightening or self-correcting steering, while requiring an acceptable level of force to steer the skis. If the trailing/leading ratio is lower, then the ski may not be self-correcting or self-straightening after a turn. In addition, one is more apt to oversteer the ski since less force is need to steer the ski.

In order to help balance and control the tradeoff between self-correcting and steering effort associated with trailing skags 34, the carbide strips 42 in the present invention are moved forward with respect to the skags 34 (see FIG. 7). That is, even though the skags 34 are 60/40 trailing, the carbide strips 42 may be positioned 50/50 with respect to the centerpoint C. Thus, as shown in FIG. 7, the longitudinal centerpoint C' of the skags 34 is about 60/40 trailing with respect to the longitudinal centerpoint C of the carbide strips 42. Moving the carbide strips 42 forward in this manner reduces the amount of steering torque required to steer the ski. Thus, some of the steering torque increase resulting from a trailing skag is recovered by centering or even leading the carbide strip 42. Thus, preferably, the trailing/leading ratio of the dual skags 34 with respect to the longitudinal centerpoint C is greater than the trailing/leading ratio of the carbide strips 42 with respect to C. Stated differently, preferably the longitudinal centerpoint C (FIG. 7) of the carbide strips 42 is positioned forwardly of the longitudinal centerpoint C' (FIG. 7) of the skags 34 when the skag center is positioned rearward of the running surface center C.

In the typical prior art ski configuration, a single skag is attached centrally to the underside of the ski. The typical prior art skag consists of a round rod. In one preferred embodiment, shown in FIG. 5, a square or rectangular skag cross-section typically allows the skags 34 to be shorter than a round cross-section and is thus desirable. Rectangular or square edges don't lose their edge as easily while turning. As a result, the longitudinal length of a rectangular skag 34 can be shortened by a greater amount, without sacrificing steering ability.

Figure 8:
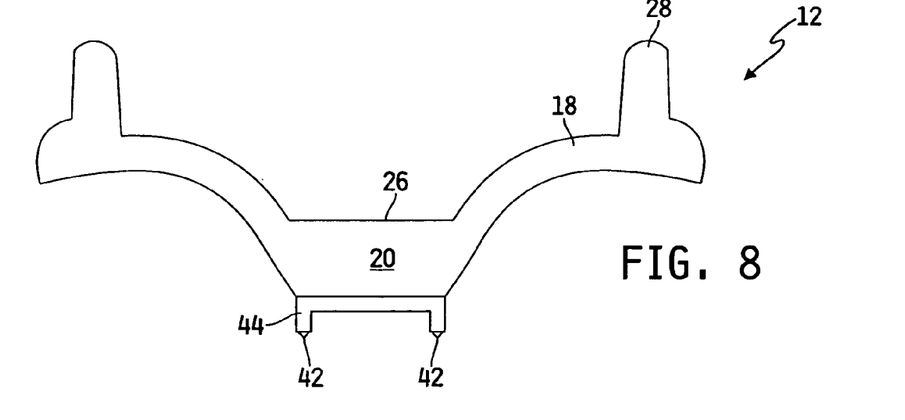
FIG. 8 is an end sectional view of another embodiment of a ski of the present invention.
Figure 9:
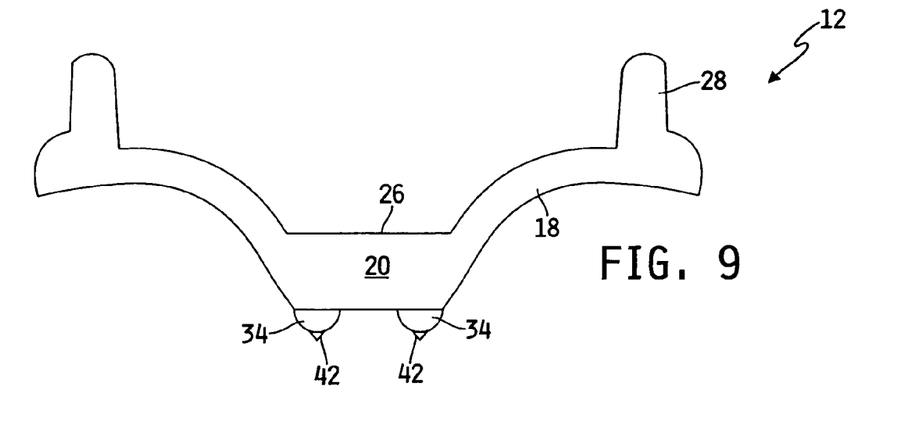
FIG. 9 is an end sectional view of yet another embodiment of a ski of the present invention.

Additionally, possible problems associated with round cross-sections are alleviated. For example, pebbles or other debris may become lodged in the volume between the bottom, planar surface of the ski runner 18 and upper, inward curve of a skag having a circular cross-section. This can contribute to excessive wear of the runner and/or keel when not protected by a wear strip. This problem is not limited to round cross-sectional skags. Any skag with an inner surface 54 that angles inward may be subject to this problem. Thus, as shown in FIGS. 5, 8, and 9, it is preferable to have skags 34 with inner surfaces 54 that do not angle downwardly inward towards each other. The skag inner surfaces 54 should therefore extend (linearly or curved) either away from each other (outward) or merely downward to each other. Pebbles and other debris is less likely to become lodged in-between the skag inner surfaces 54 under these configurations.

In a preferred embodiment, the wear strip 32 may be comprised of steel and span about 1.5 inches wide, preferably matching the width of the keel 20. The preferred embodiment has two steel, ⅜ inch square skags 34 mounted at either edge of the strip 32, thereby maintaining a ¾ inch space between the two skags 34. In comparison, the ski is typically about 5½ inches wide. Moreover, the wear strip 32 should be at least about ⅛ inch thick—preferably at least about 3/16 inches. The skags 34, mounted at the outer edges of the keel, create a deep keel ski. The keel 20 preferably has a depth of about ¾ inch at its deepest point (typically under the spindle 14) and preferably tapers to the bottom surface of the runner 18 towards the ends of the ski.

As shown best in FIGS. 4, 6, and 7, the skags 34 are preferably relatively narrow and may taper in two different directions at their front and rear. For instance, the depth of the skags 34 may taper upward to the level of the runner 18. The width of each skag 34 may also taper to an apex (not shown). The tapers help the ski 12 glide along the snow.

While it may be preferable to use a wear strip 32 when using shorter skags 34, a wear strip 32 is not necessary to the current invention. As seen in FIG. 9, the skags 34 may attach directly to the keel 20 of the runner 18. The skags 34 may be attached directly to the runner 18 by any suitable method. One preferred method includes the use of the same series of threaded shafts 40 (shown in FIGS. 4 and 7) extending through the ski runner 18 where they are attached via a correspondingly threaded nut. However, instead of using one series of threaded shafts in this embodiment, a series of threaded shafts should extend from the upper surface of each skag 34 in the embodiment shown in FIG. 9.

The skags 34 in FIG. 9 could also be partially embedded into the keel 20 bottom surface. That is, a recess could be carved or molded into the keel bottom for receiving a portion of the skags 34. In the design shown in FIG. 9, the skags 34 may be of whole round stock but yet embedded into the keel such that only half protrudes out the bottom of the keel 20. Other skag shapes besides round, half-round, and rectangular may be used. Preferably, as discussed above, the inner surfaces of the skags 34 (no matter what cross-sectional shape is used) will not angle inward or undercut.

A further embodiment of the invention includes a kit for converting a single skag keel ski into the dual skag keel ski of the present invention. Although it is envisioned that snowmobile skis may be manufactured with the dual skag configuration as original equipment (possibly as an integral component of a composite-based ski), the dual skag configuration can be easily retrofitted to most currently available skis.

The kit, shown best in FIGS. 6 and 7, includes a strip 22 having two skags 24 attached thereto, as seen, for example, in FIG. 5. The old skag and/or wear strip may be removed from the ski by unscrewing the nuts that secure it to the ski 12 and replaced with the combined skag 34 and wear strip 32 or the integral unit 44.

While a preferred embodiment of the present invention has been described, it should be understood that various changes, adaptations, and modifications may be made therein without departing from the spirit of the invention and the scope of the appended claims.

What is claimed is:

1. A snowmobile ski comprising:
   a longitudinally extending runner having a bottom running surface;
   a keel extending downward from the bottom running surface of the runner;
   a generally flat, elongate wear strip having top and bottom surfaces, the top surface being generally contoured to abut the bottom surface of the keel; and
   two skags extending longitudinally along the keel and downward from the bottom surface of the wear strip, the skags each having an inside surface and an outside surface, the skags spaced laterally from each other to define a longitudinal channel between the inside surfaces of the skags, the inside surfaces of the skags extending downward from the surface of the wear strip in a laterally non-inward direction, the bottom running surface defining a longitudinal center, the skags being positioned such that they extend longitudinally more rearwardly of the running surface center than forwardly of the running surface center.

2. The snowmobile ski of claim 1 wherein the keel has lower outside edges each aligned with respective outside edges of the wear strip, the skags each having upper outside edges aligned with respective outside edges of the wear strip.

3. The snowmobile ski of claim 1, wherein the skags have generally rectangular cross-sections.

4. The snowmobile ski of claim 1 wherein the inside surfaces of the skags extend downward from the bottom surface of the wear strip linearly.

5. The snowmobile ski of claim 1 wherein the runner includes an upwardly curved forward end portion, the wear strip extending forwardly of the skags to cover and protect at least a pan of the bottom surface of the runner's upwardly curved forward end portion from wear.

6. The snowmobile ski of claim 1 wherein the wear strip extends forwardly of the skags so that the wear strip at least partially fills a skag track in the snow encountered by the ski.

7. The snowmobile ski of claim 1 wherein the skags are tapered at their front and rear ends.

8. The snowmobile ski of claim 1 wherein the skags taper at front and rear ends toward the strip.

9. The snowmobile ski of claim 1 wherein the the wear strip extends longitudinally behind the skags so that the track left by the skags in the snow may be at Least partially filled in by the wear tip.

10. A snowmobile ski comprising:
    a longitudinally extending runner having a bottom surface;
    a downwardly extending keel along the bottom surface of the runner, the keel having right and left lower side edges; and
    two skags extending longitudinally along and downward from the keel, the skags each having an inside surface and an outside surface, the skags spaced laterally from each other to define a longitudinal channel between the inside surfaces of the skags, the inside surfaces of the skags extending downward from the keel in a laterally non-inward direction, the distance between the upper outer edges of the skags being generally equal to distance between the right and left lower side edges of the keel, the lateral spacing of the skags being maintained by a wear strip rigidly interconnecting the skags.

11. The snowmobile ski of claim 10, wherein the wear strip top and bottom surfaces, the top surface being generally contoured to abut the bottom surface of the keel.

12. The ski of claim 10 wherein the runner includes a center point, the skags being positioned such that they extend more rearwardly of the center point than forwardly of the center point.

13. The ski of claim 10, wherein the skags and wear strip are integrally formed.

14. A kit for converting a single skag ski into a dual skag ski when the single skag is removed from the single skag ski, the kit comprising:
    a generally flat, elongate wear strip having top and bottom surfaces, the top surface being generally contoured to abut a bottom surface of the ski;
    two skags extending longitudinally along and downward from the bottom surface of the wear strip, the skags each having an inside surface and an outside surface, the skags spaced laterally from each other to define a longitudinal channel between the inside surfaces of the skags, the inside surfaces of the skags extending downward from the surface of the wear strip such that their inside surfaces do not extend laterally towards each other, the channel remaining generally free of surfaces that extend downwardly laterally toward the skag inside surfaces, whereby the channel is generally free undercutting surfaces that potentially trap debris against the skag inside surfaces; and
    an attachment mechanism that connects the wear strip to the bottom surface of the ski.

15. The kit of claim 14, wherein the attachment mechanism includes a plurality of threaded rods configured for extension through corresponding holes in the ski to be secured by nuts.

16. The kit of claim 14, wherein the wear strip and skags are integrally formed.

17. The kit of claim 14, wherein the skags have a generally rectangular cross-section.

* * * * *

UNITED STATES PATENT AND TRADEMARK OFFICE
CERTIFICATE OF CORRECTION

PATENT NO.        : 7,090,229 B2  
APPLICATION NO.   : 10/885496  
DATED             : August 15, 2006  
INVENTOR(S)       : Monsrud et al.

Page 1 of 1

It is certified that error appears in the above-identified patent and that said Letters Patent is hereby corrected as shown below:

In column 7, line 61 after the word "a", delete the word "pan" and insert the word --part--.

In column 8, line 5 after the word "wherein", delete the word "the".

In column 8, line 7 after the word "at", delete the word "Least" and insert the word --least--.

In column 8, line 8 after the word "wear", delete the word "tip" and insert the word --strip--.

In column 8, line 27 after the word "strip", insert the word --has--.

In column 8, line 51 after the word "free", Insert the word --of--.

Signed and Sealed this

Twenty-fourth Day of October, 2006

JON W. DUDAS  
*Director of the United States Patent and Trademark Office*